(12) United States Patent
Fernandez

(10) Patent No.: US 11,919,277 B2
(45) Date of Patent: Mar. 5, 2024

(54) METHOD FOR REPAIRING DELAMINATION AND MOISTURE BY HEAT, PRESSURE AND ADHESIVE

(71) Applicant: Rangel Fernandez, Doral, FL (US)

(72) Inventor: Rangel Fernandez, Doral, FL (US)

(73) Assignees: Rangel Fernandez, Doral, FL (US), part interest; Maria Andrea Fernandez, Doral, FL (US), part interest ( * ) Notice: Subject to any disclaimer, the term of this patent is extended or adjusted under 35 U.S.C. 154(b) by 423 days.

(21) Appl. No.: 17/361,024

(22) Filed: Jun. 28, 2021

(65) Prior Publication Data

US 2021/0323279 A1    Oct. 21, 2021

Related U.S. Application Data

(63) Continuation-in-part of application No. 16/536,001, filed on Aug. 8, 2019, now Pat. No. 11,046,461.

(Continued)

(51) Int. Cl.
*B32B 17/10*  (2006.01)
*B29C 65/00*  (2006.01)
(Continued)

(52) U.S. Cl.
CPC ...... *B32B 17/10963* (2013.01); *B29C 65/542* (2013.01); *B29C 73/025* (2013.01);
(Continued)

(58) Field of Classification Search
CPC ....... B64F 5/40; B64C 1/1492; B64C 65/544; B64C 66/00145; B64C 66/342; B64C 66/45; B64C 66/87; B64C 70/443; B64C 73/166; B29C 73/025; B29C 73/02; B29C 73/00; B29C 73/32; B29C 65/00; B29C 65/48; B29C 65/52; B29C 65/524; B29C 65/54; B29C 65/542; B29C 66/00; B29C 66/40; B29C 66/41; B29C 66/43;
(Continued)

(56) References Cited

U.S. PATENT DOCUMENTS

| | | | | |
|---|---|---|---|---|
| 3,311,517 A | * | 3/1967 | Rankin | B29C 66/81433 |
| | | | | 156/286 |
| 4,952,257 A | * | 8/1990 | Forler | B32B 17/10036 |
| | | | | 425/13 |

(Continued)

*Primary Examiner* — Philip C Tucker
*Assistant Examiner* — Brian R Slawski
(74) *Attorney, Agent, or Firm* — Malloy & Malloy, P.L.; Robert M. Downey

(57) ABSTRACT

A method for repairing window laminates in which two plies have become separated to create a void, and wherein moisture may have entered through an edge of the window laminate and into the void. The method includes the steps of: placing the window laminate in a vacuum bag and inserting the vacuum bag containing the window laminate into an oven or autoclave for a minimum of ten minutes at a minimum temperature of 120 degrees Fahrenheit to remove the moisture between the plies; removing the vacuum bag and window laminate from the oven, and removing the window from the vacuum bag; forcing a needle on a syringe through the edge of the window laminate in the area of the void; and injecting an adhesive in the syringe into the void to fill the void with the adhesive.

2 Claims, 4 Drawing Sheets

Related U.S. Application Data

(60) Provisional application No. 62/715,968, filed on Aug. 8, 2018.

(51) Int. Cl.

| | | |
|---|---|---|
| *B29C 65/54* | (2006.01) | |
| *B29C 73/02* | (2006.01) | |
| *B29L 31/00* | (2006.01) | |
| *B32B 7/12* | (2006.01) | |
| *B32B 37/12* | (2006.01) | |
| *B32B 38/00* | (2006.01) | |
| *B32B 38/16* | (2006.01) | |
| *B64F 5/40* | (2017.01) | |

(52) U.S. Cl.
CPC ............ *B32B 7/12* (2013.01); *B32B 37/1284* (2013.01); *B32B 38/164* (2013.01); *B29C 66/43* (2013.01); *B29L 2031/778* (2013.01); *B32B 2038/166* (2013.01); *B32B 2605/006* (2013.01); *B64F 5/40* (2017.01)

(58) Field of Classification Search
CPC ......... B29C 66/242; B29C 70/44; B32B 7/12; B32B 17/10963; B32B 37/1284; B32B 38/164; B32B 2038/166; B32B 2605/18; B32B 2419/00; B32B 2605/006; B32B 2605/08; B32B 27/08; B32B 27/308; B32B 3/08; B29L 2031/778
USPC ..... 156/60, 94, 99, 103, 104, 106, 107, 109, 156/145, 146, 147, 156, 285, 286, 287, 156/292, 305, 98; 52/204.6; 428/34; 264/36.1, 36.15
See application file for complete search history.

(56) References Cited

U.S. PATENT DOCUMENTS

| | | | | |
|---|---|---|---|---|
| 5,049,217 | A * | 9/1991 | Forler | .................... B29C 73/025 |
| | | | | 425/13 |
| 5,405,468 | A * | 4/1995 | Olson | ............... B32B 17/10036 |
| | | | | 156/101 |
| 5,506,057 | A * | 4/1996 | Olson | ............... B32B 17/10963 |
| | | | | 156/99 |
| 6,804,924 | B2 * | 10/2004 | Zurn | ........................ E06B 3/677 |
| | | | | 52/786.13 |
| 6,916,392 | B2 * | 7/2005 | Trpkovski | ................ B28D 1/14 |
| | | | | 141/59 |
| 2018/0313100 | A1* | 11/2018 | Borys | .................. E06B 3/6608 |

\* cited by examiner

METHOD FOR REPAIRING DELAMINATION AND MOISTURE BY HEAT, PRESSURE AND ADHESIVE

This non-provisional patent application is a Continuation-In-Part of co-pending non-provisional patent application Ser. No. 16/536,001 filed on Aug. 8, 2019, now U.S. Pat. No. 11,046,461, which is based on provisional patent application Ser. No. 62/715,968 filed on Aug. 8, 2018.

BACKGROUND OF THE INVENTION

Field of the Invention

The invention relates to a method for repairing a delaminated transparent laminate window structure in which two plies of the laminate have been delaminated and or wherein moisture has entered through an edge of the window laminate structure.

Discussion of the Related Art

Window laminates typically comprise two to five plies of glass and/or acrylic material which are bound together by interposed polyvinyl adhesive plies. One particular disadvantage of window laminates of this nature is their tendency to delaminate under certain conditions or after a certain length of time. Upon delamination, the desired characteristics of the laminate (strength, durability, light transmittance characteristics, etc.) are substantially and adversely effected. Further, once this delamination occurs, the delamination spreads rather rapidly throughout the entire window laminate structure. A further problem occurs when moisture enters through the edge of the window laminate structure at the areas of delamination and into the void created by delamination of the two plies. Naturally, it is undesirable to have moisture between plies in a window laminate structure, as this will result in fogging and severely diminished transparency of the window, as well as a degradation of the structural integrity of the window laminate structure.

Methods for repairing delamination of aircraft window laminate structures are disclosed in U.S. Pat. No. 4,780,162 to Forler et al. and U.S. Pat. No. 5,049,217 to Forler, the contents of which are incorporated herein by reference.

SUMMARY OF THE INVENTION

The present invention is directed to a method for repairing a delaminated window structure in which two plies of the laminate window structure have been delaminated and/or wherein moisture has entered through an edge of the window laminate structure causing the window to become unfit for use. The method of the present invention can be used to repair laminate window structures in a variety of fields including, but not limited to, aircraft windows, bullet resistant windows (e.g., automobile windows, armored trucks, etc.), and impact resistant windows for architectural use. An aircraft window laminate structure typically includes an outermost nonstructural glass ply and an innermost nonstructural glass ply. A central structural glass ply or panel is sandwiched between the outermost and innermost glass plies and a layer (i.e., film) of polyvinyl butyral (PVB) is laminated between the glass plies. Sometimes, this PVB layer breaks down and causes partial delamination between the PVB layer and the glass plies, such as the outermost glass ply and the central structural glass ply. The present invention provides for a method of repairing the areas of delamination.

The method includes placing the window laminate in a vacuum bag and inserting it into an oven or autoclave for a specific ramp up/hold and ramp down, depending on the severity of the delamination or moisture presented.

Subsequently, a syringe is filled with adhesive. The syringe is affixed to a hypodermic needle and the needle is forced into the void or edge of aircraft window laminate at the delaminated area. The adhesive is injected into the delaminated area to fill the void between plies and prevent moisture or delamination from returning.

After an inspection, typically a visual inspection, if the delaminated area has not been fully repaired by heating in the oven or autoclave or by injection of the adhesive into the void between the plies, then the outermost glass ply and/or the innermost glass ply are removed and the damaged or defective PVB layer is removed and a new PVB film layer is replaced. Subsequently, the removed outermost or innermost glass ply is then replaced and fixed in sealed attachment to complete the repaired aircraft window laminate structure.

Objects and Advantages of the Present Invention

Considering the forgoing, it is a primary object of the present invention to provide a method for repairing window laminate structures which can be performed at a cost substantially less than the original cost of the window laminate structure.

It is a further object of the present invention to provide a method for effectively removing moisture from within voids created by delamination of an aircraft window laminate structure.

It is yet a further object of the present invention to provide a method for effectively removing moisture from within voids created by delamination of a window laminate structure and for repairing delaminated areas of a window laminate structure including aircraft windows, bullet resistant windows and architectural impact resistant windows.

These and other objects and advantages of the present invention are more readily apparent with reference to the following detailed description taken in conjunction with the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
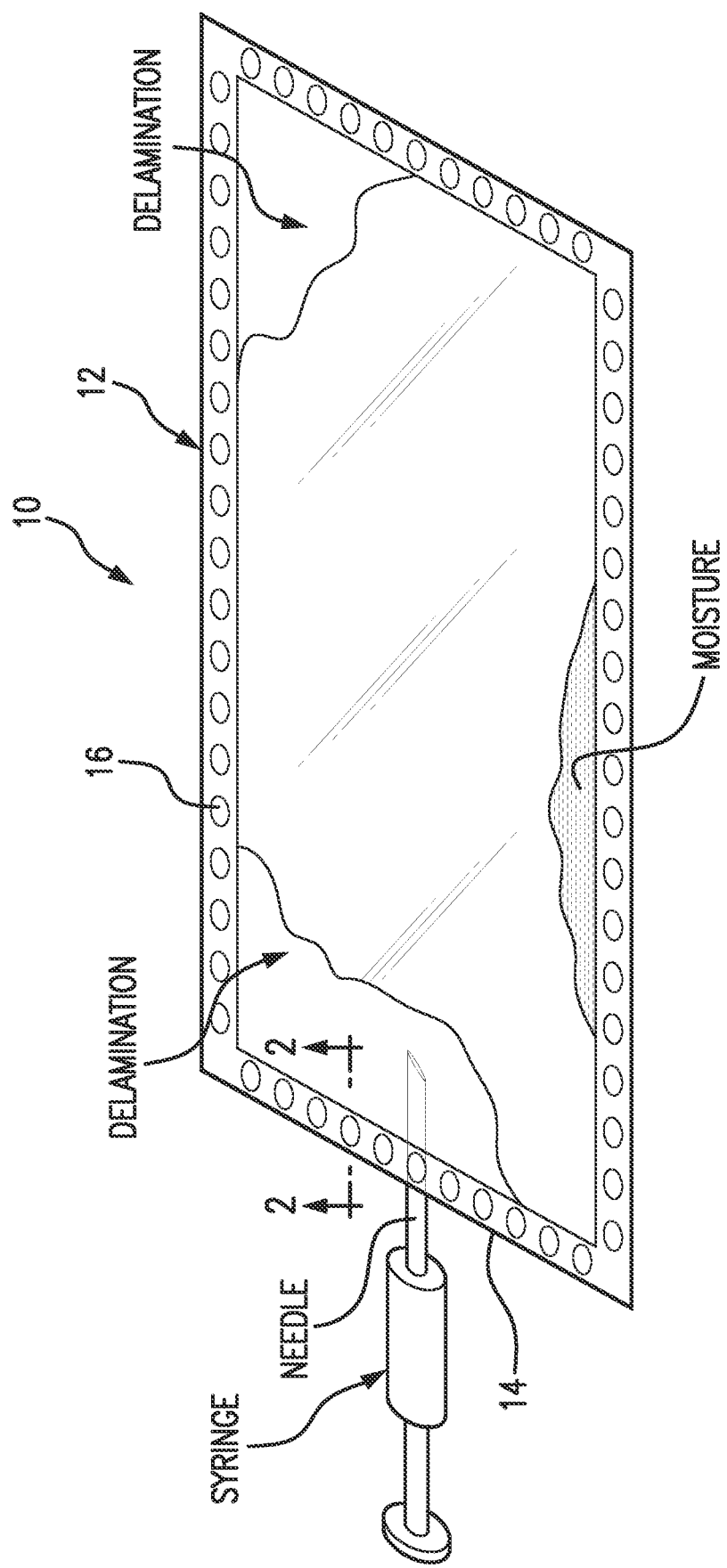
FIG. 1 is a perspective view of an aircraft window illustrating the manner in which the syringe and hypodermic needle is inserted through the seal member into the void of the plies of the laminate which have become separated.

Referring to FIG. 1, a typical aircraft window 10 comprises a transparent laminate structure 12 having several glass and/or acrylic plies adhered together by means of interposed adhesive plies. A frame structure 16 is secured about a perimeter of the window 12 to secure the laminate plies. In particular, the frame structure holds a peripheral edge 14 of the two or more plies of the window laminate structure 12 tightly together.

As noted above, one particular problem encountered with window laminates, such as the type shown in FIG. 1, is the tendency of the two or more plies to delaminate. Upon delamination, voids are created between the two or more plies. Sometimes, moisture can enter through the edge 14 of the window laminate structure 12 to fill the voids created by delamination.

The present invention provides a method for removing moisture within the voids of delaminated window laminate structures and further a method for repairing the delaminated areas. The method for removing moisture includes the steps of: placing the window laminate structure in a vacuum bag and sealing the vacuum bag closed; inserting the vacuum bag containing the window laminate into an oven or autoclave for a minimum of ten minutes at a minimum temperature of 120 degrees Fahrenheit to remove the moisture between the two or more plies of the delaminated aircraft window laminate structure; removing the vacuum bag and the window laminate structure from the oven or autoclave; and removing the window from the vacuum bag. The method further includes the steps of repairing the delaminated areas by forcing a needle on a syringe through the edge 14 of the window laminate structure 12 in the area of delamination and injecting an adhesive in the syringe into the void to fill the void with the adhesive; and removing the needle from the void and from the edge of the window laminate structure.

Figure 2:
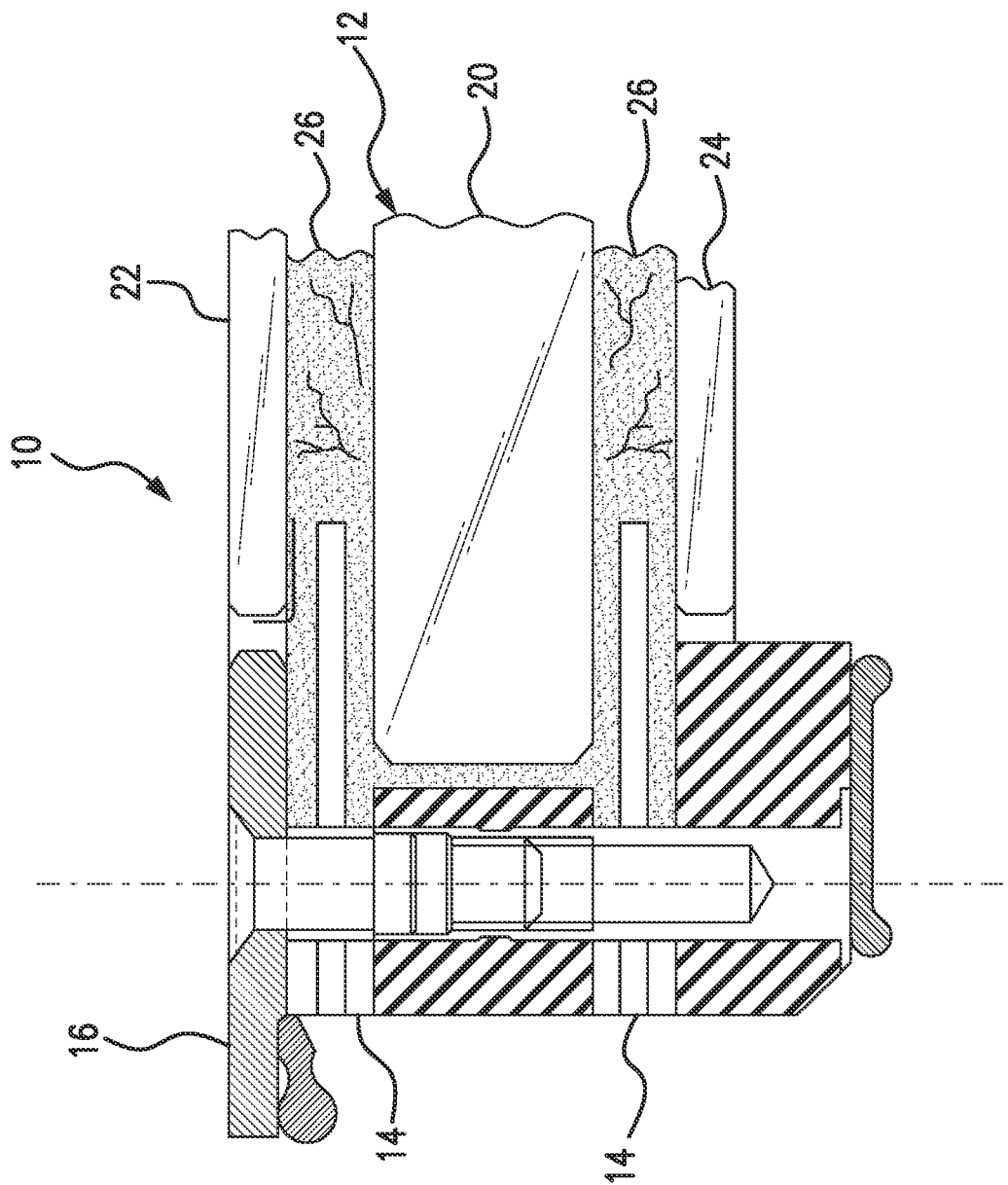
FIG. 2 is an isolated cross-sectional view taken along the plane indicated by the arrows 2-2 in FIG. 1 and illustrating the multiple plies of the laminate structure of the aircraft window including a nonstructural outer glass ply, a center structural glass member and a nonstructural inner glass ply, and wherein a polyvinyl butyral (PVB) layer between the outer ply and the central structural glass member and between the inner glass ply and the central structural glass member is shown to be defective.
Figure 3:
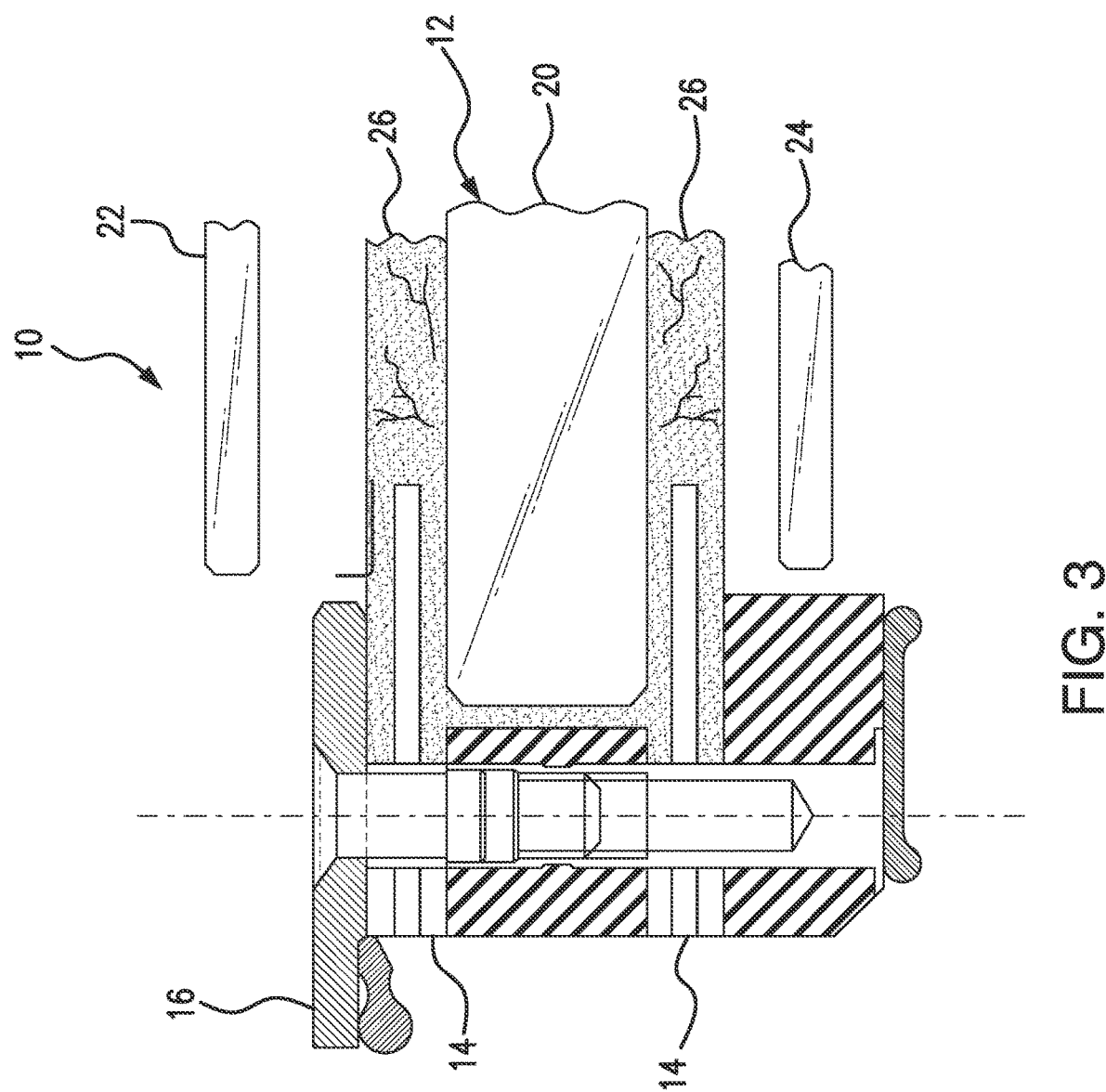
FIG. 3 is an isolated cross-sectional view similar to FIG. 2 and showing the outer glass ply and inner glass ply removed to allow repair of the damaged PVB plies.
Figure 4:
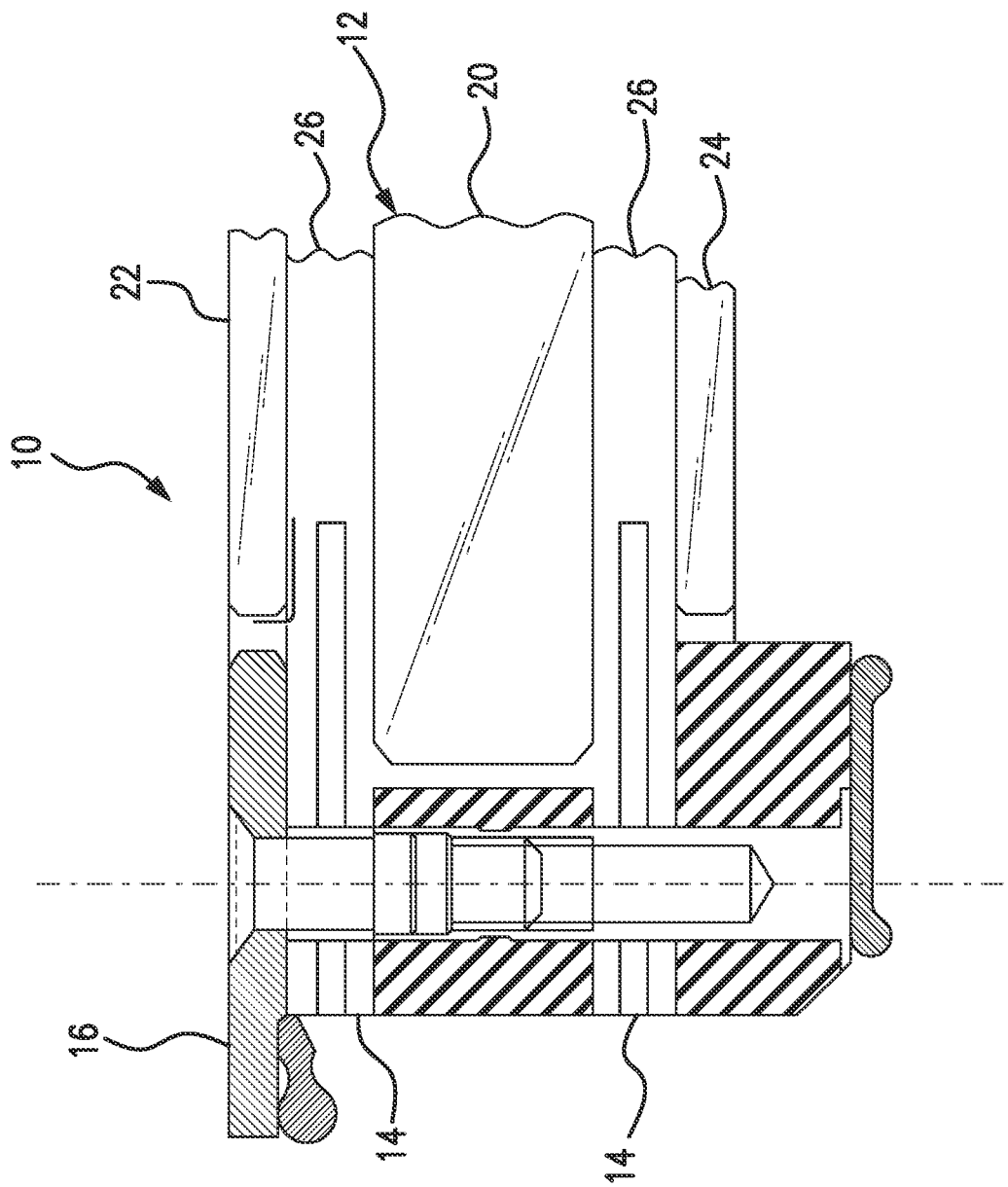
FIG. 4 is a cross-sectional view similar to FIG. 2 and wherein the PVB layers have been repaired and the outer and inner glass plies replaced.

Referring to FIGS. 2-4, an isolated cross-section of the transparent laminate structure of the aircraft window 10 of FIG. 1 is shown. The laminate structure of the aircraft window 10 includes the several glass and/or acrylic plies including a central structural glass ply 20, a nonstructural deicing outer glass ply 22 and a nonstructural defogging inner glass ply 24. The glass plies 20, 22 and 24 are bonded together by adhesive layers 26. The adhesive layers are typically formed of a polyvinyl butyral (PVB) material.

In FIG. 2, the PVB layer is shown to be damaged. According to the method of the present invention, following the step of injecting the adhesive by syringe into the void in the areas of delamination, if, after inspection, the delamination is not fully repaired by heating in the oven/autoclave and the injection of adhesive, and/or the PVB plies are simply damaged, then it is necessary to remove the outer glass ply 22 and/or the inner glass ply 24 in order to repair the damaged adhesive ply 26. Once the outer and/or inner glass plies are removed, the damaged PVB adhesive layer is removed and replaced. Typically, the PVB layer is removed by application of heat that is sufficient to cause the PVB layer to soften and separate from the glass plies.

FIG. 3 shows the outer and inner glass plies 22, 24 removed to allow removal and replacement of the adhesive PVB plies 26. Once removed, new PVB adhesive ply is installed and the outer and inner glass plies 22 and 24 are replaced, as shown in FIG. 4, thereby fully repairing the previously delaminated laminate structure of the aircraft window 10.

While the present invention has been shown and described in accordance with a preferred and practical embodiment, it is recognized that departures from the instant disclosure are fully contemplated within the spirit and scope of the present invention which is not to be limited except as defined in the following claims as interpreted under the Doctrine of Equivalents.

What is claimed is:

1. A method for repairing a window laminate which has been delaminated and wherein moisture has entered into a void created by delamination, comprising the steps of:
    placing the window laminate into a vacuum bag, sealing the vacuum bag closed and placing the vacuum bag containing the window laminate into an oven or an autoclave for a minimum of ten minutes at a minimum temperature of 120 degrees Fahrenheit to remove moisture between plies of the window laminate;
    removing the vacuum bag and the window laminate from the oven or the autoclave;
    and removing the window laminate from the vacuum bag;
    inspecting the window laminate for damage or defects;
    removing at least one of an outer nonstructural glass ply or an inner nonstructural glass ply upon determining damage or a defect in an adhesive ply of the window laminate;
    removing the damaged or defective adhesive ply;
    replacing the damaged or defective adhesive ply with a new adhesive ply; and
    reattaching the removed at least one of the outer nonstructural glass ply or the inner nonstructural glass ply to the window laminate to complete a repair of the window laminate.

2. A method for repairing a window laminate which has been delaminated and wherein moisture has entered into a void created by delamination, comprising the steps of:
    placing the window laminate into a vacuum bag, sealing the vacuum bag closed and placing the vacuum bag containing the window laminate into an oven or an autoclave for a minimum of ten minutes at a minimum temperature of 120 degrees Fahrenheit to remove moisture between plies of the window laminate;
    removing the vacuum bag and the window laminate from the oven or the autoclave;
    and removing the window laminate from the vacuum bag;
    forcing a needle on a syringe through an edge of the window laminate in an area of delamination so that the needle enters into the void created by delamination;
    injecting an adhesive in the syringe into the void to fill the void with the adhesive;
    inspecting the window laminate for damage or defects;
    removing at least one of an outer nonstructural glass ply or an inner nonstructural glass ply upon determining damage or a defect in an adhesive ply of the window laminate;
    removing the damaged or defective adhesive ply;
    replacing the damaged or defective adhesive ply with a new adhesive ply; and reattaching the removed at least one of the outer nonstructural glass ply or the inner nonstructural glass ply to the window laminate to complete a repair of the window laminate.

\* \* \* \* \*